Patented Feb. 27, 1940

2,191,737

UNITED STATES PATENT OFFICE 2,191,737

PRODUCTION OF WATER-SOLUBLE CONDENSATION PRODUCTS

Richard Alles, Mannheim, Germany, assignor to I. G. Farbenindustrie Aktiengesellschaft, Frankfort-on-the-Main, Germany No Drawing. Application September 13, 1938, Serial No. 229,699. In Germany September 23, 1937

12 Claims. (Cl. 260—43)

The present invention relates to new water-soluble condensation products and a process of producing same.

In my U. S. Patent No. 2,122,124, dated June 28, 1938, there is described a process for the production of water-soluble condensation products having good tanning action by treating lignin sulphonic acid and hydroxy compounds of the benzene series together with the addition compounds of salts of sulphurous acid and aldehydes or ketones or their derivatives, such as aldehyde or ketone alcohols or acids, preferably in the presence of an excess of the aldehydes or ketones in alkaline media.

In my U. S. Patent No. 2,122,125 I have described that especially valuable water-soluble condensation products are obtained if instead of lignin sulphonic acid other cyclic sulphonic acids containing hydroxyl groups, preferably aromatic sulphonic acids,. containing hydroxyl directly attached to an aromatic nucleus, are employed.

I have now found that especially valuable water-soluble condensation products are obtained by reacting (1) the products obtainable according to the said U. S. Patent No. 2,122,125 (i. e., without the use of lignin sulphonic acid) with (2) a water-soluble lignin sulphonic acid substance, i. e., (2a) lignin sulphonic acid or (2b) water-soluble condensation products obtainable from lignin sulphonic acids with the co-employment of monohydric or polyhydric phenols or naphthols or of urea, and if desired (3) with low molecular carbonyl compounds, i. e., aldehydes or ketones which may also be employed in the form of substances capable of forming the carbonyl compounds; if desired the reaction may be carried out in the presence of condensing agents, preferably of acid or alkaline or acid ones. As low molecular carbonyl compounds there may be mentioned aldehydes and ketones with up to 4 carbon atoms.

Among suitable condensation products of lignin sulphonic acids obtained with the co-employment of phenols or naphthols and if desired with further suitable components, there may be mentioned for example the products obtainable according to the said U. S. Patent No. 2,122,124. Condensation products of lignin sulphonic acids and phenols of the kind described in U. S. Patent No. 1,539,517 (see in particular Examples 10, 11 and 12) and the German Patent No. 479,162 may also be used. When using condensation products of lignin sulphonic acids and phenols or naphthols, the condensation is carried out in a neutral or, advantageously, in an acid medium.

The water-soluble condensation products of lignin sulphonic acids and urea may be obtained, for example, by treating the lignin sulphonic acids in an acid medium with urea and low molecular aldehydes, such as formaldehyde and acetaldehyde, or with acetone.

The relative proportions of the reaction components may be varied within wide limits. The condensation is preferably carried out at elevated temperatures, as for example 40°, 70° or 100° C., but still higher temperatures may also be used. Especially in the latter case, it may be advantageous to work under pressure. If the lignin sulphonic acids or the condensation products of lignin sulphonic acids with phenols or urea be allowed to act in the absence of low molecular aldehydes or the like on the other components, for example in the presence of acid condensing agents, it is frequently of advantage to select relatively high temperatures and/or long periods of reaction.

The products of the process have valuable tanning properties and good solubility in water; they are distinguished in particular by high astringency, strong plumping power and properties giving good yield. They effect through-tanning of the hides rapidly and readily and are completely capable of replacing vegetable tanning agents. The new condensation products may be used directly for tanning or may be previously adjusted, for example to a pH-value of from 3 to 5, with substances having a buffer action, as for example salts of weak organic or inorganic acids. The condensation products may also be evaporated to dryness with an addition of buffer substances.

The following examples will further illustrate the nature of this invention but the invention is not restricted to these examples. The parts are by weight.

*Example 1*

296 parts of a formaldehyde-cresol sulphonic acid condensation product which has been neutralized with calcium hydroxide are mixed with 200 parts of cresol D. A. B. 4. 90 parts of 30 per cent formaldehyde and 16 parts of pulverulent sodium bisulphite. The mixture is rendered clearly alkaline by the addition of milk of lime and barium hydroxide and heated for from 3 to 4 hours at from 95° to 100° C. while stirring or shaking. The alkaline earth contained in the reaction mixture is then precipitated with a solution of sulphuric acid, oxalic acid and ammonium sulphate. The precipitate consisting of the sulphates and oxalates of calcium and barium is filtered off, washed and the filtrate combined with the washing liquids is made up to 1250 parts in all.

Separately therefrom, 2000 parts of a 50 per cent sulphite cellulose waste liquor neutralized with calcium hydroxide are diluted with 600 parts of water, the calcium precipitated, by the addition of a mixture of 200 parts of concentrated sulphuric acid with 400 parts of water, in the form of gypsum which is filtered off.

312.5 parts of solution obtained according to paragraph 1 are mixed with 275 parts of the filtrate obtained according to paragraph 2 and 14 parts of 30 per cent formaldehyde. The mixture is heated at from 95° to 100° C. for from 3 to 4 hours while stirring under reflux, if necessary concentrated on a waterbath, and adjusted to a pH-value of 3.2 by the addition of ammonia and formic acid. A product having excellent tanning properties is obtained.

The condensation described in paragraph 3 may also be carried out with from 5 to 10 parts of paraldehyde or 6 to 8 parts of acetone instead of formaldehyde, similar products being thus obtained.

Example 2

A solution of 88.8 parts of a condensation product of cresol sulphonic acid and formaldehyde which has been neutralized with calcium hydroxide in 90 parts of water is heated with 120 parts of cresol for half an hour on a waterbath, 570 parts of a 50 per cent sulphite cellulose waste liquor neutralized with calcium hydroxide and such an amount of milk of lime being added that the mixture reacts clearly alkaline; a solution of 12 parts of sodium bisulphite powder in 135 parts of 30 per cent formaldehyde is added while stirring and the mixture heated for from 3 to 4 hours at from 95° to 100° C. under reflux while stirring. A solution of ammonium sulphate containing sulphuric acid is added to the reaction mixture while stirring and the deposited calcium sulphate is filtered off. The whole is washed until the combined filtrate and washing water amounts to 2522 parts.

296 parts of a condensation product of formaldehyde and cresol sulphonic acid which has been neutralized with calcium hydroxide are mixed with 200 parts of cresol D. A. B. 4, 90 parts of 30 per cent formaldehyde and 16 parts of pulverulent sodium bisulphite. The mixture is rendered clearly alkaline by the addition of milk of lime and barium hydroxide and heated for from 3 to 4 hours at from 95° to 100° C. while stirring or shaking. The alkaline earth contained in the reaction mixture is then precipitated with a solution of sulphuric acid, oxalic acid and ammonium sulphate. The precipitate consisting of the sulphates and oxalates of calcium and barium is filtered off, washed and the filtrate of the washing liquids combined therewith made up to 1250 parts in all.

420 parts of the filtrate solution obtained according to paragraph 1 and 188 parts of the filtrate obtained according to paragraph 2 are heated with 10 parts of 30 per cent formaldehyde for 2 hours at from 95° to 100° C. under reflux. The reaction mixture is adjusted to a pH-value of from 3.2 to 3.4 with ammonia and formic acid. The product has excellent tanning properties.

Example 3

570 parts of 50 per cent sulphite cellulose waste liquor are mixed with 90 parts of cresol and 200 parts of water. After adding such an amount of milk of lime that the mixture has a clearly alkaline reaction, and also adding a solution of 15 parts of sodium bisulphite powder in 75 parts of 30 per cent formaldehyde, the mixture is heated for about 3 hours at from 95° to 100° C. under reflux while stirring. The calcium is precipitated with a solution of ammonium sulphate containing sulphuric acid, the gypsum filtered off and washed. The amount of combined filtrate and washing water amounts to 2094 parts.

349 parts of this filtrate are mixed with 250 parts of the filtrate according to Example 1, paragraph 1, and 12 parts of 30 per cent formaldehyde.

The mixture is heated to from 95° to 100° C. for from 3 to 4 hours under reflux while stirring. After concentrating the reaction mixture, it is adjusted to a pH-value of from 3.2 to 3.5 with ammonia and 70 per cent glycollic acid.

Example 4

225 parts of reaction mixture obtainable according to Example 3 of the U. S. Patent No. 2,122,125 and made up to 450 parts by the addition of water are mixed with 275 parts of the filtrate obtained according to paragraph 2 of Example 1 above and 10 parts of aldol. The mixture is heated at from 95° to 100° C. for from 5 to 6 hours while stirring. When the reaction is completed, the whole is adjusted to a pH-value of 3.0 with sodium formate and formic acid.

Example 5

225 parts of the product obtainable according to Example 5 of the said U. S. Patent No. 1,122,125 and made up to 450 parts with water, 275 parts of the filtrate obtainable according to paragraph 2 of Example 1 above and 15 parts of 30 per cent formaldehyde are heated at from 90° to 95° C. for 3 hours under reflux while stirring or shaking. The solution obtained is adjusted to a pH-value of from 3 to 3.5 by the addition of ammonia and saccharic acid.

Example 6

570 parts of a 50 percent sulphite cellulose waste liquor neutralized with calcium hydroxide are mixed with 60 parts of dihydroxydiphenylsulphone and a solution of 15 parts of sodium bisulphite powder in 75 parts of 30 per cent formaldehyde. The mixture is rendered clearly alkaline by the addition of milk of lime and heated for 4 hours at from 95° to 100° C. under reflux while stirring. The calcium is then precipitated as gypsum by the addition of a solution of ammonium sulphate containing sulphuric acid. The filtrates obtained by filtering off and washing the gypsum are combined and made up to 1070 parts.

357 parts of this filtrate are mixed with 250 parts of the liquid obtained according to paragraph 1 of Example 1 above and 4 parts of hexamethylene tetramine and heated at from 95° to 100° C. for from 5 to 6 hours under reflux while stirring. By concentration and adjustment to a pH-value of from 3 to 3.5 by means of ammonia and formic acid, a product is obtained having valuable tanning properties.

Example 7

A mixture of 296 parts of a condensation product of cresol sulphonic acid and formaldehyde which has been neutralized with lime, 240 parts of cresol D. A. B. 4, 1C0 parts of 30 per cent formaldehyde, 30 parts of sodium bisulphite powder, 10.4 parts of milk of lime, 6 parts of barium hydroxide ($Ba(OH)_2.8H_2O$) and 300 parts of water is heated for 3 hours on a waterbath under reflux. 14.18 parts of concentrated sulphuric acid, 20 parts of ammonium sulphate and 30 parts of oxalic acid are then added and, after 10 minutes, 30 parts of oxalic acid and 70 parts of water are added. After heating for another 2 hours, the whole is filtered and and the filtrate made up to 1280 parts.

Separately therefrom, 600 parts of 50 per cent lime-free sulphite cellulose waste liquor, 36 parts of urea, 60 parts of 30 per cent formaldehyde and 225 parts of water are heated for 4 hours on a waterbath under reflux and made up to 910 parts.

279 parts of the filtrate obtained according to paragraph 1 and 304 parts of the product obtained according to paragraph 2 are heated with 10 parts of 30 per cent formaldehyde on a waterbath for from 4 to 5 hours.

The product is adjusted to a pH-value of the range of 3.0 to 3.3 with ammonia and formic acid.

What I claim is:

1. The process for producing water-soluble condensation products, which comprises reacting (1) a product obtainable by treating in an alkaline medium a cyclic sulphonic acid containing at least one hydroxyl group other than lignin sulphonic acid and a hydroxyl compound of the benzene series together with an addition compound of a salt of sulphurous acid and a carbonyl compound selected from the class consisting of the aldehydes, ketones, aldehyde alcohols, ketone alcohols, aldehyde acids and ketone acids with (2) a water-soluble lignin sulphonic acid substance selected from the group consisting of lignin sulphonic acid and water-soluble lignin sulphonic acid condensation products obtained with the co-employment of a substance of the group consisting of monohydric and polyhydric phenols and naphthols and urea.

2. The process for producing water-soluble condensation products, which comprises reacting (1) a product obtainable by treating in an alkaline medium a cyclic sulphonic acid containing at least one hydroxyl group other than lignin sulphonic acid and a hydroxyl compound of the benzene series together with an addition compound of a salt of sulphurous acid and a carbonyl compound selected from the class consisting of the aldehydes, ketones, aldehyde alcohols, ketone alcohols, aldehyde acids and ketone acids with (2) a water-soluble lignin sulphonic acid substance selected from the group consisting of lignin sulphonic acid and water-soluble lignin sulphonic acid condensation products obtained with the co-employment of a substance of the group consisting of monohydric and polyhydric phenols and naphthols and urea and (3) a low molecular carbonyl compound.

3. The process for producing water-soluble condensation products, which comprises reacting in the presence of a condensing agent (1) a product obtainable by treating in an alkaline medium a cyclic sulphonic acid containing at least one hydroxyl group other than lignin sulphonic acid and a hydroxyl compound of the benzene series together with an addition compound of a salt of sulphurous acid and a carbonyl compound selected from the class consisting of the aldehydes, ketones, aldehyde alcohols, ketone alcohols, aldehyde acids and ketone acids with (2) a water-soluble lignin sulphonic acid substance selected from the group consisting of lignin sulphonic acid and water-soluble lignin sulphonic acid condensation products obtained with the co-employment of a substance of the group consisting of monohydric and polyhydric phenols and naphthols and urea.

4. The process for producing water-soluble condensation products, which comprises reacting in the presence of a condensing agent (1) a product obtainable by treating in an alkaline medium a cyclic sulphonic acid containing at least one hydroxyl group other than lignin sulphonic acid and a hydroxyl compound of the benzene series together with an addition compound of a salt of sulphurous acid and a carbonyl compound selected from the class consisting of the aldehydes, ketones, aldehyde alcohols, ketone alcohols, aldehyde acids and ketone acids with (2) a water-soluble lignin sulphonic acid substance selected from the group consisting of lignin sulphonic acid and water-soluble lignin sulphonic acid condensation products obtained with the co-employment of a substance of the group consisting of monohydric and polyhydric phenols and naphthols and urea and (3) a low molecular carbonyl compound.

5. The process for producing water-soluble condensation products, which comprises reacting (1) a product obtainable by treating in an alkaline medium a cyclic sulphonic acid containing at least one hydroxyl group other than lignin sulphonic acid and a hydroxyl compound of the benzene series together with an addition compound of a salt of sulphurous acid and a carbonyl compound selected from the class consisting of the aldehydes, ketones, aldehyde alcohols, ketone alcohols, aldehyde acids and ketone acids with (2) a water-soluble lignin sulphonic acid substance selected from the group consisting of lignin sulphonic acid and water-soluble lignin sulphonic acid condensation products obtained with the co-employment of a substance of the group consisting of monohydric and polyhydric phenols and naphthols and urea and (3) formaldehyde.

6. The process for producing water-soluble condensation products, which comprises reacting in the presence of a condensing agent (1) a product obtainable by treating in an alkaline medium a cyclic sulphonic acid containing at least one hydroxyl group other than lignin sulphonic acid and a hydroxyl compound of the benzene series together with an addition compound of a salt of sulphurous acid and a carbonyl compound selected from the class consisting of the aldehydes, ketones, aldehyde alcohols, ketone alcohols, aldehyde acids and ketone acids with (2) a water-soluble lignin sulphonic acid substance selected from the group consisting of lignin sulphonic acid and water-soluble lignin sulphonic acid condensation products obtained with the co-employment of a substance of the group consisting of monohydric and polyhydric phenols and naphthols and urea and (3) formaldehyde.

7. Water-soluble condensation products obtainable according to claim 1.

8. Water-soluble condensation products obtainable according to claim 2.

9. Water-soluble condensation products obtainable according to claim 3.

10. Water-soluble condensation products obtainable according to claim 4.

11. Water-soluble condensation products obtainable according to claim 5.

12. Water-soluble condensation products obtainable according to claim 6.

RICHARD ALLES.